(12) United States Patent
Paul et al.

(10) Patent No.: US 6,343,266 B1
(45) Date of Patent: Jan. 29, 2002

(54) ANAPHORA ANALYZING APPARATUS PROVIDED WITH ANTECEDENT CANDIDATE REJECTING MEANS USING CANDIDATE REJECTING DECISION TREE

(75) Inventors: Michael Paul; Kazuhide Yamamoto; Eiichiro Sumita, all of Soraku-gun (JP)

(73) Assignee: ATR Interpreting Telecommunications Research Laboratories, Kyoto (JP)

( * ) Notice: Subject to any disclaimer, the term of this patent is extended or adjusted under 35 U.S.C. 154(b) by 0 days.

(21) Appl. No.: 09/512,881

(22) Filed: Feb. 25, 2000

(30) Foreign Application Priority Data

Feb. 26, 1999 (JP) .......................................... 11-050340
Jan. 17, 2000 (JP) .......................................... 12-007768

(51) Int. Cl.$^7$ ........................... G06F 17/27; G06F 17/21
(52) U.S. Cl. .................... 704/9; 704/4; 704/7; 704/257; 707/532
(58) Field of Search .............................. 704/9, 10, 1, 2, 704/4, 7, 8, 251, 257; 707/3, 4, 5, 6, 530, 531, 532, 533, 536

(56) References Cited

U.S. PATENT DOCUMENTS

| | | | | |
|---|---|---|---|---|
| 5,497,319 A | * | 3/1996 | Chong et al. ................... | 704/2 |
| 5,535,120 A | * | 7/1996 | Chong et al. ................... | 704/3 |
| 5,794,050 A | * | 8/1998 | Dahlgren et al. .............. | 395/708 |
| 5,799,276 A | * | 8/1998 | Komissarchik et al. ...... | 704/251 |
| 5,963,940 A | * | 10/1999 | Liddy et al. .................... | 707/5 |
| 6,006,221 A | * | 12/1999 | Liddy et al. .................... | 707/5 |
| 6,026,388 A | * | 2/2000 | Liddy et al. .................... | 707/1 |
| 6,205,456 B1 | * | 3/2001 | Nakao ............................ | 707/531 |

FOREIGN PATENT DOCUMENTS

| | | | |
|---|---|---|---|
| DE | 10008502 | * | 9/2000 |
| JP | 411242670 | * | 9/1999 |

OTHER PUBLICATIONS

IBM Tech Dis Bull No. NA9001395: "Method for Automatic Extraction Topics in Expository Prose", vol. 32, issue 8A, pp. 395–397, published Jan. 1990.*
"Evaluating Automated and Manual Acquisition of Anaphora Resolution Strategies", Chinatsu Aone et al., Systems Research & Applications Corp, pp. 122–129.
"A Machine Learning Approach to Anaphoric Reference", Dennis Connolly et al., The Mitre Corp., pp. 255–261.
"Speech and Language Databases for Speech Translation Research in ATR", Toshiyuki Takezawa et al., ATR Interpreting Telecommunications Research Lab., EALREW '98, pp. 148–155.

* cited by examiner

Primary Examiner—Joseph Thomas

(57) ABSTRACT

An anaphora analyzing apparatus is disclosed for automatically estimating an anaphora referential relation or an antecedent of a noun for use in a natural language sentence. A storage unit stores analyzed results outputted from an analyzer, and an antecedent candidate generator detects a target component required for anaphora analysis in accordance with the current analyzed results and the past analyzed results stored in the storage unit, and generates antecedent candidates corresponding to the target component. Then, a candidate rejecting section rejects unnecessary candidates having no potential for anaphora referential relation among the antecedent candidates by using a predetermined rejecting criterion, and outputs the remaining antecedent candidates. Further, a preference giving section calculates a predetermined estimated value for each of the remaining antecedent candidates by referring to an information table including predetermined estimation information obtained from a predetermined training tagged corpus, and gives the antecedent candidates preference in accordance with the calculated estimated value. Finally, a candidate deciding section decides a predetermined number of antecedent candidates based on a given preference in accordance with the preferenced antecedent candidates.

5 Claims, 3 Drawing Sheets

PREFERRED EMBODIMENT
ANAPHORA ANALYZING APPARATUS

ANAPHORA ANALYZING APPARATUS PROVIDED WITH ANTECEDENT CANDIDATE REJECTING MEANS USING CANDIDATE REJECTING DECISION TREE

BACKGROUND OF THE INVENTION

1. Field of the Invention

The present invention relates to an anaphora analyzing apparatus for use in a natural language analysis, and in particular, to an anaphora analyzing apparatus for automatically estimating an anaphora referential relation or an antecedent of a noun for use in a natural language sentence, namely, estimating what a pronoun, a demonstrative pronoun or the like specifically indicates in the natural language sentence. In the present invention, targets for which the anaphora analysis should be performed are nouns including nouns, pronouns and demonstrative pronouns.

2. Description of the Prior Art

Upon estimating an anaphora referential relation of a noun in a natural language analyzing apparatus, it has been generally thought that a person previously interprets a sentence in a field to be analyzed and that he makes anaphora rules.

Moreover, because of a recent provision of an environment allowing use of a tagged corpus obtained after morphological analysis and parsing analysis, a method employing a decision tree obtained by applying a machine training method to the tagged corpus is disclosed in, for example, a prior art document 1, D. Conolly et al., "A Machine Training Approach to Anaphora relation" in Proceeding of NeMLaP, 1994 (referred to as a first prior art hereinafter), and a prior art document 2, C Aone et al., "Evaluating Automated and Manual Acquisition of Anaphora Resolution Strategies" in Proceeding of ACL, pp. 122–129, 1995 (referred to as a second prior art hereinafter)

After manually making the anaphora rules as described above, when an actual application of the anaphora rule results in an improper estimation, it is necessary to analyze a cause of the erroneous estimation and then add or improve the anaphora rules. Thus, only an expert in the technology of natural language analyzing apparatus can, in fact, make the anaphora rules.

Moreover, the first prior art employs the method in which a better candidate is selected by comparing two candidates in sequence by use of the decision tree for selection of an antecedent. In this case, there is a possibility that the selected antecedents may be different from each other depending on the entry order of the antecedent candidates. Therefore, the first prior art has a problem in that it cannot ensure that the candidate having truly high priority is selected. Furthermore, the second prior art utilizes the decision tree for selecting the antecedent, but consideration is not given to an integration of frequency statistics and location information upon giving preferences. Therefore, the second prior art has a problem in that the accuracy of an anaphora analysis is relatively low.

When the above-mentioned tagged corpus is used, the decision tree is generated in accordance with the method of providing the tagged corpus, and thus the amount of data may affect the estimation accuracy. Moreover, the estimation may end in failure by the influence of a subtle difference in nature between the input sentence and the tagged corpus. In other words, the conventional natural language analyzing apparatus has the following problems. When constructing the anaphora analysis rules, it is necessary for the expert in the composition of the natural language analyzing apparatus to make the rules or verify the analyzed results, and thus the time and cost required for making the rules are increased. Moreover, the use of the machine training does not cause problems of time and cost, however, the machine training has problems in that estimation is normally unsuccessful due to a large or small amount of data or the differences in nature.

SUMMARY OF THE INVENTION

An object of the present invention is therefore to provide an anaphora analyzing apparatus capable of performing anaphora analysis with accuracy higher than that of the prior art.

In order to achieve the aforementioned objective, according to one aspect of the present invention, there is provided an anaphora analyzing apparatus comprising:

analyzing means for analyzing an input natural language sentence and outputting analyzed results;

storing means for storing the analyzed results outputted from the analyzing means;

antecedent candidate generating means for detecting a target component in the input natural language sentence required for anaphora analysis in accordance with the current analyzed results outputted from the analyzing means and the past analyzed results stored in the storing means, and for generating antecedent candidates corresponding to the target component;

candidate rejecting means for rejecting unnecessary candidates having no potential for anaphora referential relation among the antecedent candidates generated by the antecedent candidate generating means by using a predetermined rejecting criterion, and for outputting the remaining antecedent candidates, the rejecting criterion being of a decision tree obtained by using a machine training method in accordance with a training tagged corpus to which predetermined word information is given for each word of the training tagged corpus;

preference giving means for calculating a predetermined estimated value for each of the remaining antecedent candidates outputted from the candidate rejecting means, by referring to an information table including predetermined estimation information obtained from a predetermined further training tagged corpus, for giving the antecedent candidates preference in accordance with the calculated estimated value, and for outputting preferenced antecedent candidates; and candidate deciding means for deciding and outputting a predetermined number of antecedent candidates based on the given preference in accordance with the preferenced antecedent candidates outputted from the preference giving means.

In the above-mentioned anaphora analyzing apparatus, the candidate rejecting means selects and outputs one or more antecedent candidates when all the antecedent candidates are rejected by the candidate rejecting means.

In the above-mentioned anaphora analyzing apparatus, the estimation information for the information table preferably includes frequency information obtained from the predetermined further training tagged corpus.

In the above-mentioned anaphora analyzing apparatus, the estimation information for the information table preferably have been known to those skilled in the art, and then, generates a tagged corpus including tags such as information about a part of speech of a word and information about a relation between a relative and a noun, which are analyzed results. Thereafter, the analyzer 1 stores the analyzed results in an analyzed result memory 11, and outputs the analyzed results to the antecedent candidate generator 2. In the present preferred embodiment, the tagged corpus is provided with word information such as regular expression, part of speech, semantic code, like gender, person and number for each word. Next, the antecedent candidate generator 2 detects a target component in the input sentence required for anaphora analysis in accordance with the analyzed results of the input tagged corpus by referring to the tagged corpus of the past analyzed results stored in the analyzed result memory 11, and also generates antecedent candidates corresponding to the target component, and outputs the antecedent condidates to the candidate rejecting section 3. Succinctly speaking, the antecedent candidate generator 2 extracts the nouns from the input tagged corpus and the past tagged corpuses by using a known method, so as to generate the antecedent candidates that are the nouns as considered to have anaphora referential relation.

In the above-mentioned anaphora analyzing apparatus, the estimation information for the information table preferably includes predetermined information calculated in accordance with frequency information obtained from the predetermined further training tagged corpus and a distance between a target component for anaphora analysis and antecedent candidates obtained from the predetermined further training tagged corpus.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Preferred embodiments according to the present invention will be described below with reference to the attached drawings.

Figure 1:
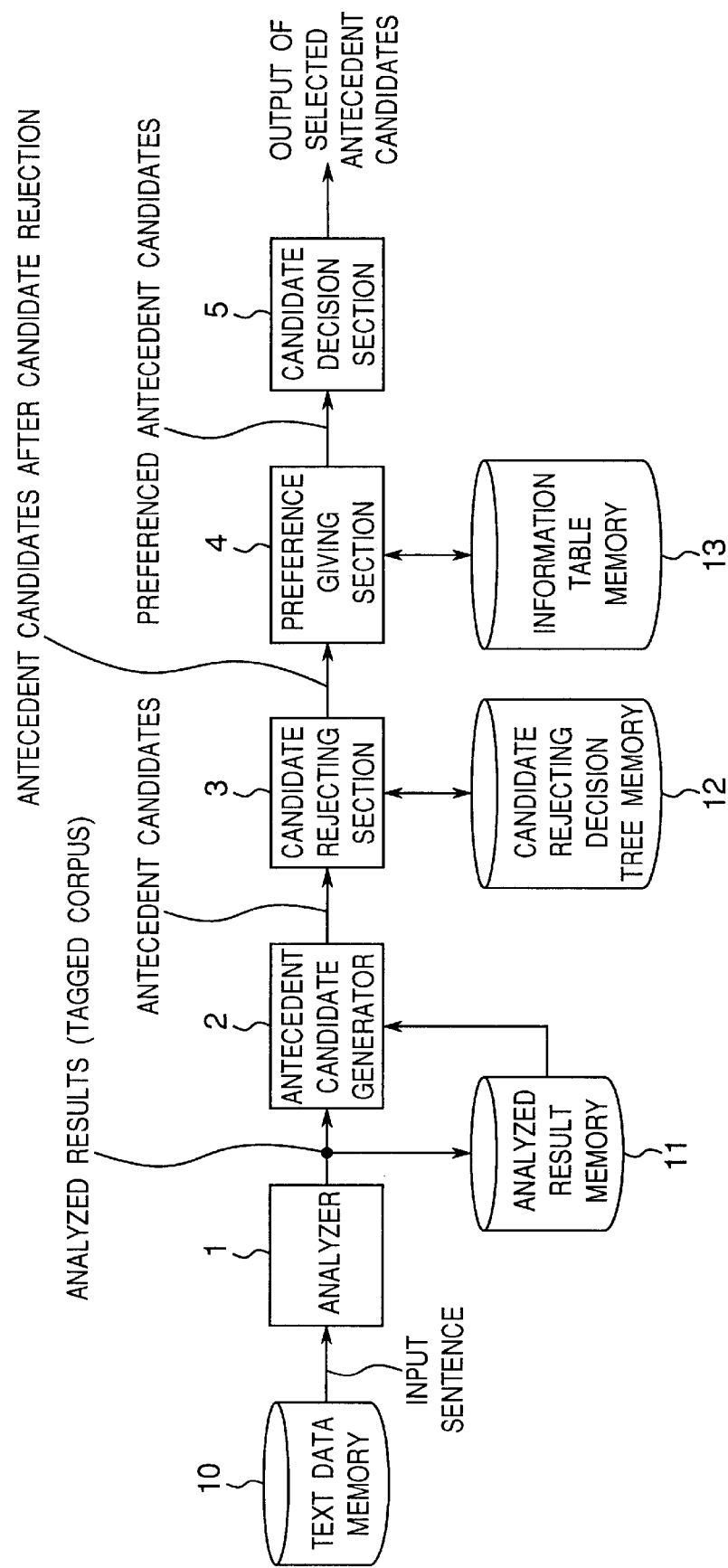
FIG. 1 is a block diagram of a configuration of an anaphora analyzing apparatus of a preferred embodiment according to the invention.

FIG. 1 is a block diagram of a configuration of an anaphora analyzing apparatus of a preferred embodiment according to the present invention. The anaphora analyzing apparatus of the present preferred embodiment is provided for executing anaphora analysis process for selection of antecedent in accordance with a tagged corpus that is text data stored in a text data memory 10. The anaphora analyzing apparatus is characterized in comprising a candidate rejecting section 3 and a preference giving section 4. The candidate rejecting section 3 rejects unnecessary candidates not having anaphora referential relation of a noun among the antecedent candidates of the noun generated by an antecedent candidate generator 2, by using a candidate rejecting decision tree stored in a candidate rejecting decision tree memory 12, so as to reduce noise inputted to the following preference giving section 4. The preference giving section 4 gives preference degree or priority to the input antecedent candidates, and outputs the preferenced antecedent candidates by integrally using an information table including frequency information and an anaphora ratio "ratio".

Referring to FIG. 1, the text data memory 10 is provided for previously storing input sentences of the text data of natural language sentences for the anaphora analysis. For example, the following input sentences are stored in the text data memory 10.

TABLE 1

Examples of Input Sentences from Text Data Memory 10

| 201 | Receptionist: Thank you. This is New York City Hotel. |
| 202 | Traveler: Hello? I am Hiroko Tanaka. I'd like to make a reservation at your hotel. |
| 203 | Receptionist: May I ask how to spell your name, please? |
| 204 | Traveler: O.K. T-A-N-A-K-A. I will stay at a youth hostel in Washington until tomorrow. |
| 205 | Receptionist: Okay. You will arrive here on the 10th, right? |

An analyzer 1 executes a predetermined analysis process for the input sentence in the natural language, such as morphological analysis, parsing analysis and the like which have been known to those skilled in the art, and then, generates a tagged corpus including tags such as information about a part of speech of a word and information about a relation between a relative and a noun, which are analyzed results. Thereafter, the analyzer 1 stores the analyzed results in an analyzed result memory 11, and outputs the analyzed results to the antecedent candidate generator 2. In the present preferred embodiment, the tagged corpus is provided with word information such as regular expression, part of speech, semantic code, like gender, person and number for each word. Next, the antecedent candidate generator 2 detects a target component in the input sentence required for anaphora analysis in accordance with the analyzed results of the input tagged corpus by referring to the tagged corpus of the past analyzed results stored in the analyzed result memory 11, and also generates antecedent candidates corresponding to the target component, and outputs the antecedent candidates to the candidate rejecting section 3. Concretely speaking, the antecedent candidate generator 2 extracts the nouns from the input tagged corpus and the past tagged corpuses by using a known method, so as to generate the antecedent candidates that are the nouns as considered to have anaphora referential relation.

Figure 2:
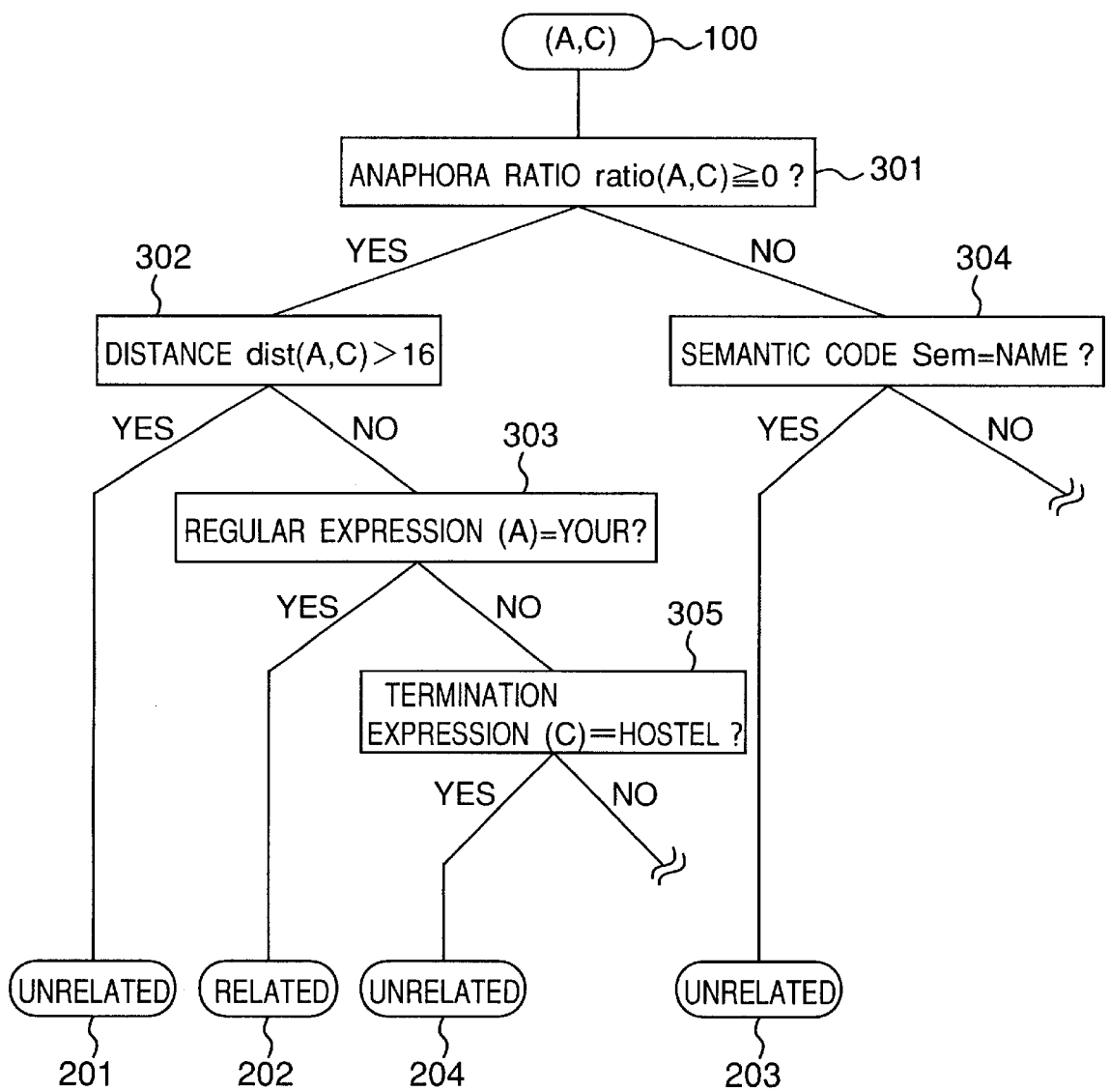
FIG. 2 shows an example of a candidate rejecting decision tree stored in a candidate rejecting decision tree memory 12 of FIG. 1.

The candidate rejecting decision tree memory 12 stores the candidate rejecting decision tree of FIG. 2, for example, which is generated by a predetermined machine training method which has been known to those skilled in the art, in accordance with the tagged corpus that has been obtained by applying the analysis process such as known morphological analysis, parsing analysis and the like to the training text data. In the present preferred embodiment, the tagged corpus is provided with word information such as regular expression, a part of speech, semantic code, like gender, person and a number for each word.

In the candidate rejecting decision tree shown in FIG. 2, whether or not a potential for the anaphora referential relation exists is determined by tracing binary trees of respective nodes from a route node 100 to leaf nodes 201, 202, 203, 204 and so on. When the potential for the anaphora referential relation does not exist, the candidate is rejected. A pair of a word "A" and an antecedent candidate "C" is inputted at the route node 100, where the word "A" is a target component to be anaphorically analyzed. A branch node 301 connected to the route node 100 determines whether or not an anaphora ratio "ratio (A, C)" between the word "A" and the word "C" calculated by using an anaphora ratio "ratio" defined by the equation (1) described below is equal to or more than a predetermined threshold value=0. Moreover, a branch node 302 determines whether or not a distance "dist" indicating the number of candidates between the word "A" and the word "C" (namely, the number of nouns) exceeds sixteen. Further, a branch node 303 determines whether or not a regular expression of the word "A" is "your". Still further, a branch node 304 determines whether or not a semantic code "Sem" defined by the known "Kadokawa Synonym New Dictionary" is a name. Furthermore, a branch node 305 determines whether or not a termination expression of the word "C" is "Hostel".

In the example shown in FIG. 2, when the branch nodes 301, 302 and 303 judge YES, NO and YES, respectively, the word "A" and the word "C" are considered to have the potential for the anaphora referential relation, and then, the candidate is not rejected. On the other hand, when the branch nodes 301 and 302 judge YES and YES, respectively, the word "A" and the word "C" are considered to have no potential for the anaphora referential relation, and then, the candidate is rejected. Moreover, when the branch nodes 301 and 304 judge NO and YES, respectively, the word "A" and the word "C" are considered to have no potential for the anaphora referential relation, and then, the candidate is rejected. Further, when the branch nodes 303 and 305 judge NO and YES, respectively, the word "A" and the word "C" are considered to have no potential for the anaphora referential relation, and then, the candidate is rejected.

Accordingly, the candidate rejecting section 3 rejects the antecedent candidates having no potential for the anaphora referential relation by using, for example, the candidate rejecting decision tree of FIG. 2 in accordance with the results of the antecedent candidates inputted from the antecedent candidate generator 2, and then, the candidate rejecting section 3 outputs the remaining antecedent candidates to the preference giving section 4. The candidate rejecting section 3 is constituted so as to output one remaining antecedent candidate or more when all the antecedent candidates should be rejected.

Next, the anaphora ratio "ratio", the distance "dist" and an anaphora estimation value (referred to as a preference value hereinafter) "pref" for use in the candidate rejecting section 3 and the preference giving section 4 will be described in detail below. The anaphora ratio "ratio" is defined by the following equation (1).

$$\text{ratio} = -\delta, \text{ for } (freq^+ = 0) \cap (freq^- = 0), \quad (1)$$
$$= \frac{freq^+ - freq^-}{freq^+ + freq^-}, \text{ for the other cases.}$$

In the above-mentioned equation (1),
(a) "$freq^+$" represents the number (hereinafter referred to as a number of positive cases) of cases (hereinafter referred to as positive cases) having anaphora referential relation between the word "A" and the word "C", namely, the frequency of co-referential anaphora-antecedent pairs; and
(b) "$freq^-$" represents the number (hereinafter referred to as the number of negative cases) of cases (hereinafter referred to as negative cases) not having the anaphora referential relation between the word "A" and the word "C", namely, the frequency of non-referential anaphora-antecedent pairs.

The value of the anaphora ratio "ratio" defined as the above-mentioned equation (1) is within a range of [−1, +1]. In the case of exclusive non-referential relations, the anaphora ratio "ratio" is equal to −1. In the case of exclusive co-referential relations, the anaphora ratio "ratio" is equal to +1. In order that a pair of references generated by ratio=0 and the corpus that is the training text data is selected by priority to a pair of references having no frequency information, the anaphora ratio "ratio" of the latter is slightly reduced in accordance with a predetermined weighting factor δ in the present preferred embodiment. In the present preferred embodiment, the anaphora ratio "ratio" is normalized as expressed by the following equation (2) by using the distance "dist" indicating the number of candidates between the word "A" and the word "C" (i.e., the number of nouns), then the preference value "pref" is defined as follows.

$$pref = \frac{1 + \text{ratio}}{dist} \quad (2)$$

As apparent from the equation (2), the larger the distance "dist" becomes, the smaller the preference value "pref" becomes. On the other hand, the smaller the distance "dist" becomes, the larger the preference value "pref" becomes. Also, as described above, the anaphora ratio "ratio" is ranged from −1 to +1. When the anaphora ratio "ratio" closes with −1, the preference value "pref" becomes smaller. On the other hand, when the anaphora ratio "ratio" closes with +1, the preference value "pref" becomes larger.

The preference value "pref" is calculated for each antecedent candidate, and a preference list of antecedent candidates is sorted in order to maximize the preference value "pref". Then, an antecedent $C_{best}$ determined by the anaphora analyzing apparatus of the present preferred embodiment is expressed as the following equation (3).

$$C_{best} = (C_i | \max \text{pref}(A, C_i)) \quad (3)$$

That is, the antecedent candidate $C_{best}$ for the analyzed result is the candidate having the maximum preference value "pref" among antecedent candidates $C_i$ for the word "A" of target component to be analyzed.

The preference giving section 4 gives the antecedent candidates preference values, among the antecedent candidates which remain by the candidate rejecting process and are outputted from the candidate rejecting section 3, by referring to the frequency information and the anaphora ratio "ratio" stored in an information table memory 13, and then, the preference giving section 4 outputs the candidates having the preference value or the priority order to a candidate decision section 5. In the information table memory 13, the frequency information including the number of positive cases and the number of negative cases and the anaphora ratio "ratio" are calculated and stored for each of antecedent candidates for target components of interest to be anaphorically analyzed in accordance with the tagged corpus which has been obtained by applying the analysis process such as the known morphological analysis, parsing analysis and the like to the training text data. Furthermore, the candidate decision section 5 finally narrows or the number of the antecedent candidates down to a predetermined number of antecedent candidates, namely, N antecedent candidates (N-best) in consideration of the priority order, and then, outputs the results as the selected antecedent candidates.

In the anaphora analyzing apparatus constituted as described above, each of the analyzer 1, the antecedent candidate generator 2, the candidate rejecting section 3, the preference giving section 4 and the candidate decision section 5 is constituted by a control processing unit such as a digital computer or the like. Each of the text data memory 10, the analyzed result memory 11, the candidate rejecting decision tree memory 12 and the information table memory 13 is constituted by a storage unit such as a hard disk memory or the like.

EXPERIMENTS AND EXPERIMENTAL RESULTS

The result of process, which was obtained by performing the anaphora analysis process by use of the anaphora analyzing apparatus of the present preferred embodiment, will be described by taking, for example, the sentences for use in a Japanese conversation associated with a travel. The sentences inputted to this apparatus are described above in Table 1. An operation of the apparatus for analyzing the anaphora referential relation of "your" in the sentence number 202, and of "here" in the sentence number 205 shown in Table 1 will be described hereinafter.

The tagged corpus that was analyzed results of the above-described input sentence by the analyzer 1 will be described below. The information having an arrow such as (←401) appended to "your" indicated by 403 is the information which is obtained as a result of the anaphora analysis. Although such information is described for convenience of the description of Table 6, this information is not provided at the time of the end of the analysis.

TABLE 2

Analyzed Results (Tagged Corpus)

Receptionist: Thank you. This is [(401) New York City Hotel].
Traveler: Hello? I am [(402) Hiroko Tanaka]. I'd like to make a reservation at [(403) (←401) your] [(404) (←401) hotel].
Receptionist: May I ask how to [(406) spell] your [(405) (←402) name], please?
Traveler: O.K. T-A-N-A-K-A [(407) (↱406)].
I will stay at [(408) a youth hostel] in Washington until tomorrow.
Receptionist: Okay. You will arrive [(409) (←403) here] on the 10th, right?

(Notes) Only the tags needed for anaphora analysis are described in Table 2.

Next, the antecedent candidate generator 2 extracts the nouns preceding "your", "hotel" and "here" as the antecedent candidates. The results of the antecedent candidates will be shown in Table 3.

TABLE 3

Results of Antecedent Candidates

| | |
|---|---|
| Your: | Hiroko Tanaka |
| Your: | I |
| Your: | New York City Hotel |
| Hotel: | Your hotel |
| Hotel: | Hiroko Tanaka |
| Hotel: | I |
| Hotel: | New York City Hotel |
| Here: | 10th |
| Here: | Youth Hostel |
| Here: | Washington |
| Here: | Tomorrow |
| Here: | T-A-N-A-K-A |
| Here: | Spell |

TABLE 3-continued

Results of Antecedent Candidates

| | |
|---|---|
| Here: | Name |
| Here: | Your |
| Here: | Reservation |
| Here: | Hotel |
| Here: | Your |
| Here: | Hiroko Tanaka |
| Here: | I |
| Here: | New York City Hotel |

Next, one example of the candidate rejecting process by the candidate rejecting section 3 will be described below. Tables 4A and 4B show examples of trace when the candidate rejecting section 3 executes the candidate rejecting process using the decision tree shown in FIG. 2.

TABLE 4A

Example of Candidate Rejecting Process
by Candidate Rejecting Section 3

(A) Target Components (Your, New York City Hotel)

(A1) At Route Node 100:
    A = [(403) your]
    C = [(401) New York City Hotel]
    (See Table 2)
(A2) At Branch Node 301:
    Anaphora Ratio "ratio" (Your, New York City Hotel) =+ 1.00
    (See Table 6)
    Result = YES
(A3) At Branch Node 302:
    Distance "dist" (Your, New York City Hotel) = 3
(See Table 2)
<Notes> Because of dist = 1 for Hiroko Tanaka, dist = 2 for I, and dist = 3 for New York City Hotel.
    Result = NO
(A4) At Branch Node 303:
    Regular Expression (Your) = Your
    Result = YES
(A5) At Branch Node 202:
    Result of Decision Tree: Related (B) Target Components (Your, Youth Hostel)

(B1) At Route Node 100:
    A = [(409) your]
    C = [(408) Youth Hostel]
    (See Table 2)
(A2) At Branch Node 301:
    Anaphora Ratio "ratio" (Your, Youth Hostel) =+ 1.00
    (See Table 6)
    Result = YES
(A3) At Branch Node 302:
    Distance "dist" (Your, Youth Hostel) = 2 (See Table 2)
<Notes> Because of dist = 1 for 10th, and dist = 2 for Youth Hostel.
    Result = NO
(A4) At Branch Node 303:
    Regular Expression(Your) = Your
    Result = NO
(A5) At Branch Node 305:
    Termination Expression(Youth Hostel) = (1, tel, stel, hostel, . . . )
    Result = YES
(A6) At Branch Node 204:
    Result of Decision Tree: Unrelated The whole determination of the above-mentioned candidate rejecting process is shown in Table 5.

TABLE 5

Results of Candidate Rejecting Process

| Target of Analysis | Antecedent candidate | Determination |
|---|---|---|
| Your | Hiroko Tanaka | X |
| Your | I | X |
| Your | New Your City Hotel | ○ |
| Here | 10th | X |
| Here | Youth Hostel | X |
| ... | | |
| Here | Hiroko Tanaka | ○ |
| Here | New York City Hotel | ○ |

In this table, ○ represents a antecedent candidate not rejected, and X represents a rejected antecedent candidate.

If all the candidates are rejected, for example, a process is executed such as (a) all the candidates are selected;
(b) two of the most recent candidates are selected;

or the like, and then, the following process can be continued. In the following example, only one candidate is left if two candidates are rejected for the target component "Your" in accordance with the determination of Table 5, and therefore, the process will be described including the two rejected candidates for convenience of the description. The following is described in a manner similar to that for the target component "Here". One example of the information stored in the information table memory 13 is as follows. This information table is obtained by adding up the tagged corpuses shown in Table 2. However, although the same illustrative sentences as the input sentences are used in Table 2 for the description, the tags of different sentences from the input sentences may be added in fact. In Table 2, for example, the positive case for "your" having (403) is "New York City Hotel" in (401), and the negative cases thereof are two cases "Hiroko Tanaka" and "I".

TABLE 6

Information Table
Including Frequency Information and Anaphora Ratio "ratio"

| Target Component of Interest | Antecedent Candidate | Type | Number of Positive Cases | Number of Negative Cases | Anaphora Ratio "ratio" |
|---|---|---|---|---|---|
| Your | New York City Hotel | w-w | 7 | 0 | +1.00 |
| | New York City Hotel | r-r | 7 | 0 | +1.00 |
| | I | w-w | 0 | 2 | −1.00 |
| | <Store> | r-s | 34 | 59 | −0.27 |
| <Demonstrative Pronoun> | <Store> | s-s | 103 | 94 | +0.05 |
| <Direction> | <Store> | s-s | 85 | 85 | 0.00 |
| <Third Person> | <Store> | s-s | 85 | 85 | 0.00 |
| Your | Tanaka | w-w | 0 | 24 | −1.00 |
| | <Name> | r-s | 1 | 103 | −0.98 |
| Here | The 10th | w-w | 0 | 2 | −1.00 |
| | The N-th | r-r | 0 | 18 | −1.00 |
| | <Day> | r-s | 0 | 85 | −1.00 |
| | <Period> | r-s | 0 | 17 | −1.00 |
| | <Unit> | r-s | 2 | 114 | −0.97 |
| Here | New York City Hotel | w-w | 3 | 0 | +1.00 |
| Here | Youth | w-w | 3 | 2 | +0.20 |
| Here | Hostel Tanaka | w-w | 1 | 3 | −0.50 |

In Table 6, <Demonstrative Pronoun> in the target component of interest means ko-so-a-do word in Japanese.

In Table 6, the target component of interest and the antecedent candidate have three abstraction levels, and a combination of these levels is defined as "type". Although "w" denotes a word itself and "r" denotes a regular form such as the conversion of "10th" into the "N-th", the originally abstract word such as "your" may have the same form for "w" and "r". "s" denotes a name of semantic code defined by the "Kadokawa Synonym New Dictionary". In other words, "w-w" denotes that the target component of interest is a word itself and an antecedent candidate is a word itself when the positive cases and the negative cases are added up. Moreover, "r-r" denotes a type having regular forms, "r-s" denotes a type having a regular form and a semantic code, and "s-s" denotes a type of a semantic code and a semantic code.

Then, one example of the preference giving process by the preference giving section 4 will be described below.

TABLE 7

Preference Giving Process

| Target component to be analyzed | Antecedent candidate | Anaphora Ratio "ratio" | Distance "dist" | Preference Value | Preference Degree |
|---|---|---|---|---|---|
| Your | Youth Hostel | +0.20 | 2 | 0.60 | 1 |
| Your | Hiroko Tanaka | −0.50 | 12 | 0.04 | 3 |
| Your | New York City Hotel | +1.00 | 14 | 0.14 | 2 |

In the example of Table 7, the antecedent candidates are preferenced so that the highest preference value or priority degree may be given to the candidate in the lowest row in each column of Table 7 and the preference value may be lowered in the upper row in each column of Table 7. In this case, the most likelihood antecedent candidate for "your" is "New York City Hotel". Comparison of the results obtained by the above-mentioned process is shown in Table 8.

TABLE 8

Comparison of Results

| Target component to be analyzed | Antecedent candidate | Candidate Rejecting Section 3 | Reference Giving Section 4 | Candidate Decision Section 5 |
|---|---|---|---|---|
| Your | Youth Hostel | X | 1 | — |
| Your | Hiroko Takana | ○ | 3 | 2 |
| Your | New York City Hotel | ○ | 2 | 1 |

(Notes) The antecedent candidate "Youth Hostel" in Table 8 is rejected by the candidate rejecting section 3, however, this shown in for comparison reference.

In Table 8, the process of the preference giving section 4, the antecedent candidate "New York City Hotel" has the highest preference value, however, this antecedent candidate has been rejected by the candidate rejecting section 3. Therefore, the candidate rejecting section 3 can prevent this antecedent candidate from being erroneously selected. As a result, the selected antecedent candidate "New York City Hotel" can be obtained as the output result from the candidate decision section 5.

Figure 3:
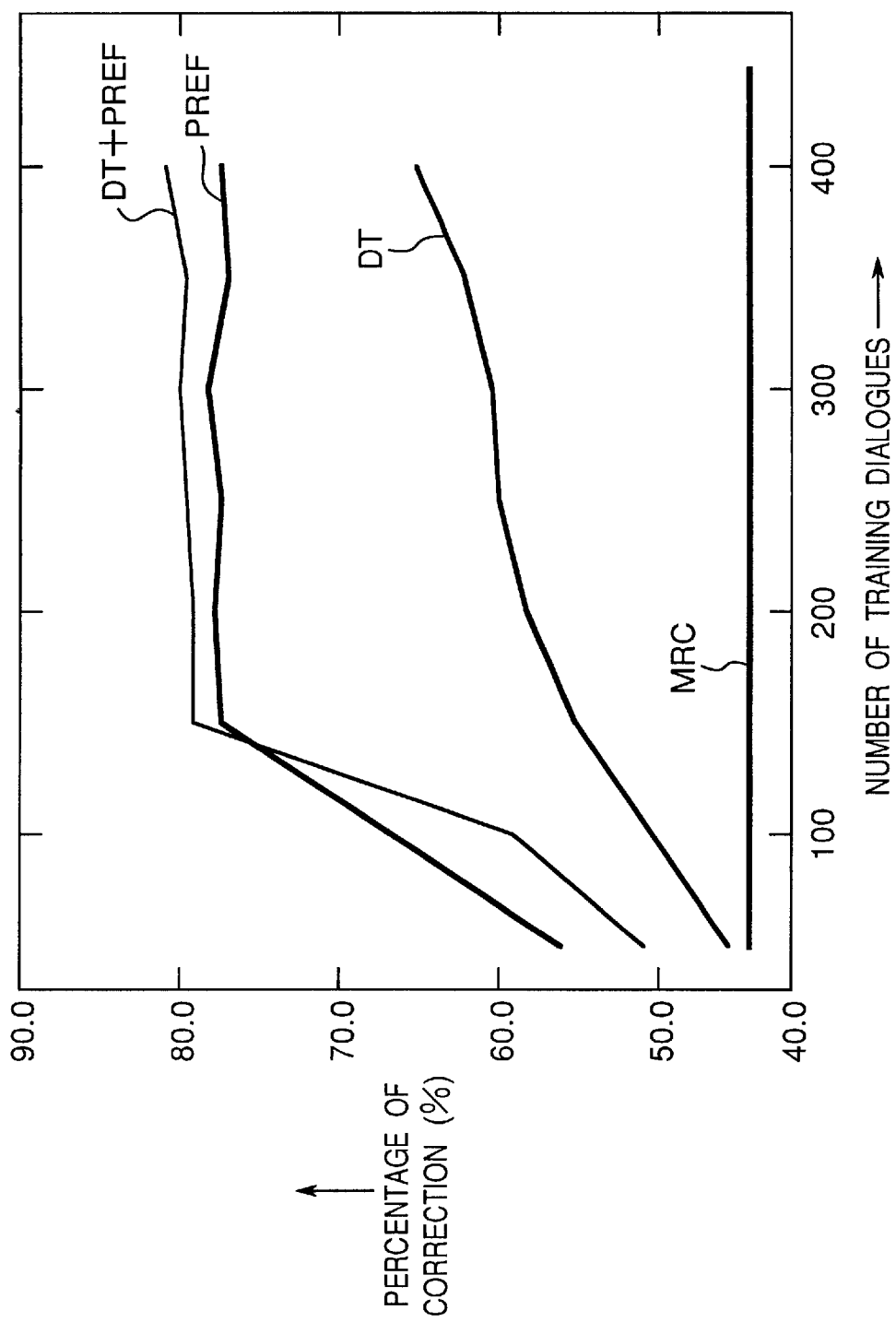
FIG. 3 is a graph of percentage of correction of anaphora analysis to a number of training dialogues, which is experimental results of the anaphora analyzing apparatus of FIG. 1.

The results of the experiment performed by using the anaphora analyzing apparatus of the present preferred embodiment is shown in FIG. 3.

Referring to FIG. 3, "DT+PREF" represents a percentage of correction when the anaphora analyzing apparatus comprises the candidate rejecting section 3 and the preference giving section 4 according to the present preferred embodiment. "PREF" represents a percentage of correction when the anaphora analyzing apparatus comprises only the preference giving section 4. "DT" represents a percentage of correction when the anaphora analyzing apparatus comprises only the candidate rejecting section 3. "MRC" represents a percentage of correction when the most recent candidate is regarded as the antecedent candidate. The percentage of correction of the anaphora analysis is measured by using an F-measure which has been known to those skilled in the art. In the present preferred embodiment, "Database of bilingual conversation for travel for speech translation research" owned by the applicant (for example, See a prior art document 3, T. Takezawa et al., "Speech and language database for speech translation research in ATR" in Proceedings of 1st International Workshop on East-Asian Language Resource and Evaluation—Oriental COCOSDA Workshop, pp. 148–155, 1998) is used to create the decision tree that is candidate selection rules and to calculate the anaphora ratio "ratio". However, it is noted that dialogues for evaluation is not used for creating the decision tree and calculating the anaphora ratio "ratio".

According to the experiment performed by the present inventor, 200 to 400 dialogues were used to create the decision tree and calculate the anaphora ratio "ratio", then the percentage of correction of the anaphora analysis of 79% to 81% was obtained with substantial stability within this range in the present preferred embodiment. On the other hand, the results of the experiments of the conventional method are as follows. When the anaphora ratio and the distance were used ("PREF"), the percentage of correction of the anaphora analysis was 77% to 78% (substantially fixed). When only the decision tree was used ("DT"), the percentage of correction of the anaphora analysis was 58% to 65% (an upward tendency). When the most recent noun was regarded as the antecedent candidate and uniquely selected ("MRC"), the percentage of correction of the anaphora analysis was 43% (fixed). We confirmed that the present preferred embodiment of the invention was most effective. When only the decision tree is used, the percentage of correction of anaphora analysis has the upward tendency within the range of 200 to 400 dialogues, and thus, there is a possibility of a higher percentage of correction. However, the present preferred embodiment is more advantageous in that the excellent result can be obtained with stability by using a relatively small amount of data.

As described above, the present preferred embodiment does not miss the high-preference candidate as compared to the first prior art. Moreover, as compared to the second prior art, the present preferred embodiment can execute the better preference giving and greatly improve the accuracy of antecedent selection. Moreover, the present preferred embodiment can be applied to various tasks by changing the corpus that is the training text data for creating the candidate rejecting decision tree and the information table.

MODIFIED PREFERRED EMBODIMENTS

In the above-mentioned preferred embodiment, the candidate rejecting section 3 rejects the candidates by using the candidate rejecting decision tree, however, the present invention is not limited to this. For example, the antecedent candidate having an anaphora ratio "ratio" less than zero may be rejected without any use of the candidate rejecting decision tree. Moreover, for instance, the antecedent candidate may be rejected when the above-mentioned distance "dist" is ten or more. Furthermore, the antecedent candidate may be rejected when the distance "dist" between the semantic codes "Sem" (indicating how far the semantic codes are away from each other) is a predetermined threshold value or more. That is, various references may be used as the reference of the rejection of antecedent candidates by the candidate rejecting section 3, as described above.

In the above-mentioned preferred embodiment, the preference giving section 4 gives the preference value or priority degree to the candidates in accordance with the anaphora referential relation value "pref", however, the present invention is not limited to this. The preference giving section 4 may give the preference value to candidates in accordance with only the anaphora ratio "ratio" or the distance "dist".

As described in detail above, according to the anaphora analyzing apparatus of the present invention, the anaphora analyzing apparatus does not miss the high preference candidate as compared to the first prior art. Moreover, as compared to the second prior art, the anaphora analysis apparatus can execute better preference giving and greatly improve the accuracy of antecedent selection. Moreover, the anaphora analysis apparatus can be applied to various tasks by changing the tagged corpus that is the training text data for creating the above-mentioned rejection criterion and the aforementioned information table.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An anaphora analyzing apparatus comprising:

analyzing means for analyzing an input natural language sentence and outputting analyzed results;

storing means for storing the analyzed results outputted from said analyzing means;

antecedent candidate generating means for detecting a target component in the input natural language sentence required for anaphora analysis in accordance with the current analyzed results outputted from said analyzing means and the past analyzed results stored in said storing means, and for generating antecedent candidates corresponding to said target component;

candidate rejecting means for rejecting unnecessary candidates having no potential for anaphora referential relation among the antecedent candidates generated by said antecedent candidate generating means by using a predetermined rejecting criterion, and for outputting the remaining antecedent candidates, said rejecting criterion being of a decision tree obtained by using a machine training method in accordance with a training tagged corpus to which predetermined word information is given for each word of the training tagged corpus;

preference giving means for calculating a predetermined estimated value for each of the remaining antecedent candidates outputted from said candidate rejecting means, by referring to an information table including predetermined estimation information obtained from a predetermined further training tagged corpus, for giving the antecedent candidates preference in accordance with the calculated estimated value, and for outputting preferenced antecedent candidates; and candidate deciding means for deciding and outputting a predetermined number of antecedent candidates based on the given preference in accordance with the preferenced antecedent candidates outputted from said preference giving means.

2. The anaphora analyzing apparatus as claimed in claim 1, wherein said candidate rejecting means selects and outputs one or more antecedent candidates when all the antecedent candidates are rejected by said candidate rejecting means.

3. The anaphora analyzing apparatus as claimed in claim 1, wherein said estimation information for said information table includes frequency information obtained from the predetermined further training tagged corpus.

4. The anaphora analyzing apparatus as claimed in claim 1, wherein said estimation information for said information table includes a distance between the target component for anaphora analysis and antecedent candidates obtained from the predetermined further training tagged corpus.

5. The anaphora analyzing apparatus as claimed in claim 1, wherein said estimation information for said information table includes predetermined information calculated in accordance with frequency information obtained from the predetermined further training tagged corpus and a distance between a target component for anaphora analysis and antecedent candidates obtained from the predetermined further training tagged corpus.

* * * * *